United States Patent [19]

Morozzi

[11] Patent Number: 4,904,022
[45] Date of Patent: Feb. 27, 1990

[54] FURNITURE STRUCTURE WITH ARCH STIFFENERS EXERTING THRUST ON THE JOINTS

[75] Inventor: Massimo Morozzi, Milan, Italy
[73] Assignee: Giorgetti S.P.A., Meda, Italy
[21] Appl. No.: 239,216
[22] Filed: Aug. 31, 1988
[30] Foreign Application Priority Data
  Sep. 4, 1987 [IT] Italy .................. 21803 A/87
[51] Int. Cl.[4] .................................................. A47C 7/00
[52] U.S. Cl. .................................. 297/440; 108/156; 248/188; 248/188.91
[58] Field of Search .............. 248/188, 188.7, 188.91; 297/440; 108/156

[56] References Cited

U.S. PATENT DOCUMENTS

| | | | |
|---|---|---|---|
| 331,111 | 11/1885 | Batton | 297/440 X |
| 469,358 | 2/1892 | Nesson | 248/188.91 |
| 901,152 | 10/1908 | Churchill | 297/440 X |
| 1,145,608 | 7/1915 | Morton | 52/291 |

FOREIGN PATENT DOCUMENTS 1257714 2/1961 France .................. 297/441

Primary Examiner—James T. McCall
Attorney, Agent, or Firm—Herbert Dubno

[57] ABSTRACT

A furniture item constructed from single elements, capable of being coupled to one another and to other elements by means of hinges, such as for example the legs of a chair, table or the like and the lateral members of the furniture item, the final stiffening of the assembled structure being provided by an internal spider or brace comprising opposed arches, the arches terminating in wedge-shaped ends and thrusting towards the hinges under the action of a central tension member, which tends to bring the opposed arches of each pair of the spider towards each other, it thereby being possible to construct the furniture item without the use of glue, adhesive or the like and the storage and transportation volume being reduced until assembly, which may be carried out even at the installation by the user himself.

12 Claims, 4 Drawing Sheets

FURNITURE STRUCTURE WITH ARCH STIFFENERS EXERTING THRUST ON THE JOINTS

FIELD OF THE INVENTION

The present invention relates to an article of furniture such as, for example, a chair, table, bed, cupboard or the like, usually furnished with legs, side members, flat surfaces or the like, which structure is composed of individed sectional elements capable of being assembled together, some of which are connected by hinges, in such a manner that by the use of a spider or brace or the like adapted for exerting thrust forces upon the hinges, the final stiffening of the structure is obtained as required for its intended use.

BACKGROUND OF THE INVENTION

Normal items of furniture possess structures, frames or the like, composed of individual elements which are then connected together to form parts or the entire structure by the use of glues, adhesives, screws, nails or the like adapted for connecting the elements in a rigid manner so as to exert the support or load-bearing action for which the furniture item is intended.

The necessity, in known articles of furniture, of using such connecting means, in particular glues or the like, obliges the fabrication to have appropriate equipment, suitable rooms and the like, with appreciable cost and the use of considerable labor.

Furthermore, furniture articles constructed in this manner require considerable space for storage and transportation due to the appreciable bulk, which is largely void volume.

OBJECT OF THE INVENTION

It is the object of the present invention to overcome the aforementioned disadvantages and to enable the assembly of an article of furniture at the destination by simple operations, even on the part of the user himself, with notable advantages in respect of cost, reduction of dimensions, elimination of the need for special working areas and the possibility of producing all the component pieces by simple operations on ordinary machines.

SUMMARY OF THE INVENTION

The advantage is achieved by the furniture structure according to this invention, composed of individual elements equipped with bearing fixings and hinges or joints for connecting them together, the elements being assembled in the intended bearing position and the structure being stiffened for use by means of a spider comprising pairs of opposed arches having wedge-shaped ends, which end exert a thrust action upon shaped supports, these supports in turn acting against these joints and thrusting them outwards, under the action of a tension member or the like which tends to bring the arches of the spider towards each other and consequently to force the end wedges into their respective seats.

The spider is composed of pairs of opposed arches, which arches, in addition to having wedge-shaped ends, are shaped to be partly elastic, thereby producing not only a translatory movement of the end wedge but also a strut action across the ends.

The spider of opposed arches may possess, at the ends, hinge bearings or the like for exerting the strut action only when the center of the spider is compressed by the associated tension member.

The closure plane cooperates in the stiffening of the structure by fitting into the seats provided when in the position of use and by a force fit in this position, produced by the tension member of the spider.

The stiffening elements may be composed of spiders having screw tension members, acting by tension upon the hinges or the like connecting the various components of the furniture together, thereby creating an inward thrust on them.

BRIEF DESCRIPTION OF THE DRAWING

These and other characteristics will become apparent from the following description of an embodiment in the form of a chair according to the present invention, prepared with reference to the accompanying drawing, in which.

Figure 1:
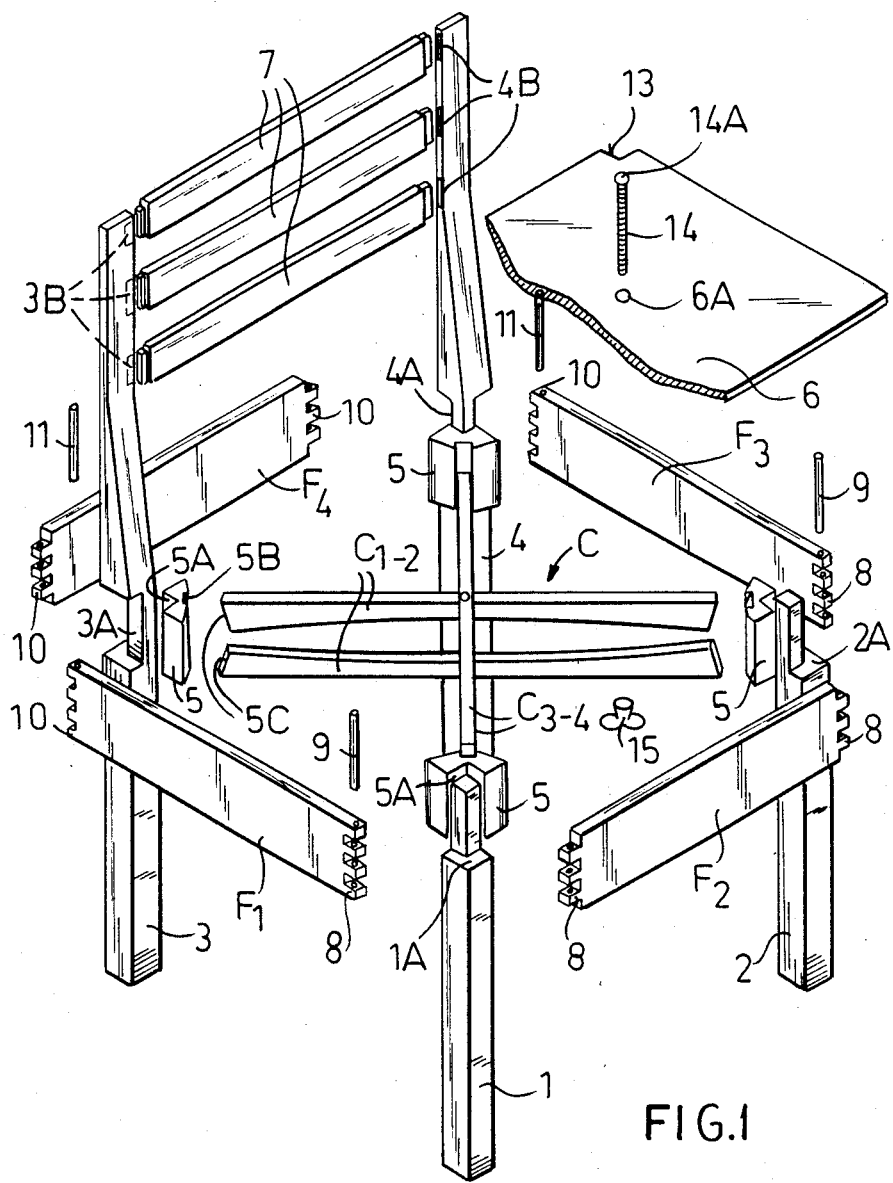
FIG. 1 is an exploded view of the chair structure according to this invention.

With reference to the attached Figures, the chair structure illustrated in FIG. 1 is composed of a series of separate pieces, constituted of two front legs 1,2, two back legs 3,4 continued upwards for the chair back, a series of four lateral members $F_1$, $F_2$, $F_3$, $F_4$, a central spider C composed of two pairs of opposed arches $C_{1-2}$ and $C_{3-4}$, equipped at their ends with shaped supports 5, of a seat plate 6 and of one or more back boards 7.

As can be seen from FIG. 1, the separate pieces, in the case of a chair structure as given by way of example, may be the same as one another, such as for instance the front legs, the lateral members, the pairs of spiders with their supports and other elements, as will be described below, it being possible in this manner to mass produce the individual components and to carry out assembly when required, even at the point of use, thereby reducing the dimensions for storage and transportation which, as is known, are always appreciable in the case of fully assembled furniture.

According to this invention, the construction and form of the individual elements enables the structure to be assembled with complete final stiffening, as required in the conditions of use, simply by placing the elements against one another under determined thrusts, without the use of glues or other holding means.

For this purpose, each front leg 1,2 is shaped at its upper end with a recess 1A,2A in such a manner as to receive towards the outside the ends of the adjacent side members $F_1,F_2$ and $F_2,F_3$, coupled to one another by means of tongue-and-groove joints 8, adapted for forming a hinge, the hinge pin 9 of which is introduced into the respective aligned holes of the joints 8.

Analogously, each rear leg 3,4 possesses a recess 3A,4A, in such a manner as to receive on the outside the ends of the adjacent side members $F_1,F_4$ and $F_3,F_4$, coupled together by the tongue-and-groove joints 10, adapted for forming a hinge, the pin 11 of which is introduced into the respective aligned holes of the joints 10.

On the inner sides of all the legs there are disposed the shaped supports 5 which possess, on the side towards the leg, a recess 5A and, on the side towards the spider, two grooves with inclined base 5B with opposite inclinations, said grooves being adapted for receiving the wedge-shaped ends, having an equal slope, of the arches of the spiders $C_{1-2}$ and $C_{3-4}$.

Figure 3:
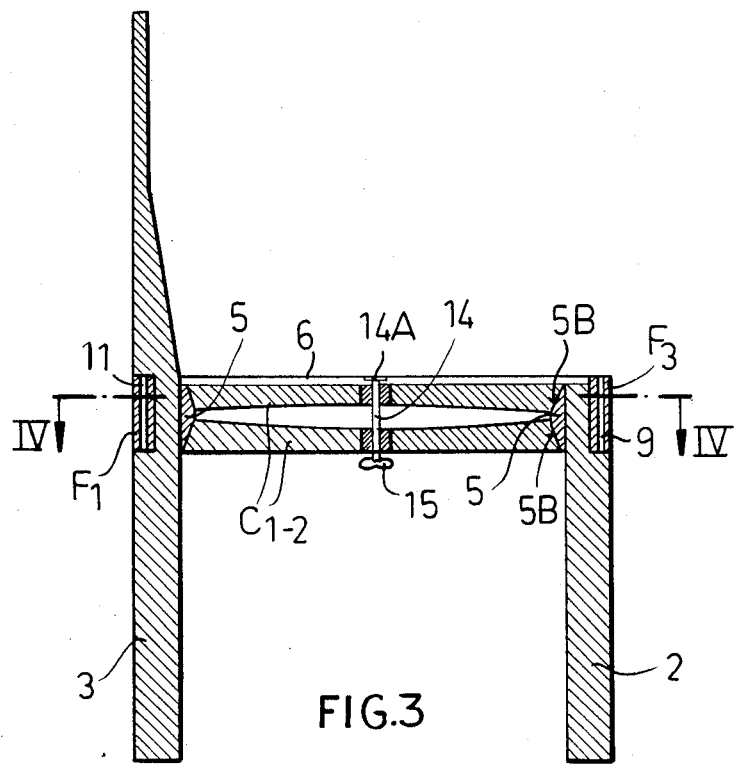
FIG. 3 is a section through the chair structure taken along the line III—III of FIG. 4.
Figure 4:
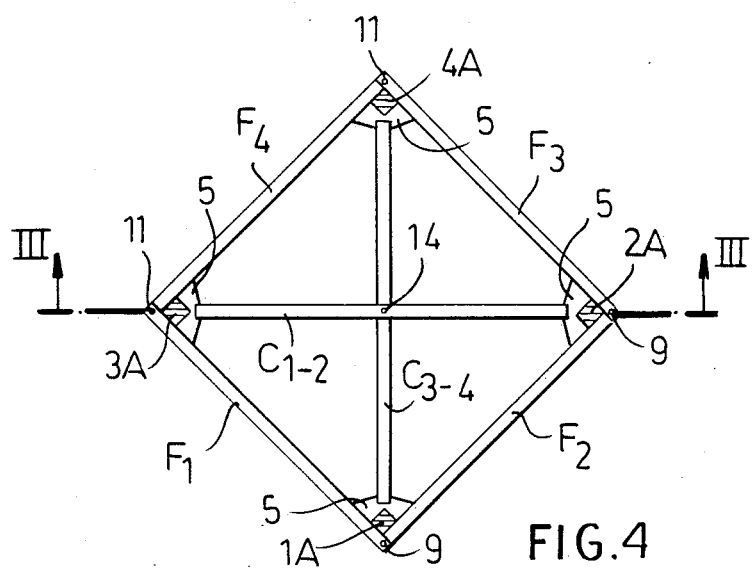
FIG. 4 is a plan view of the structure of FIG. 1 partly in section along the line IV—IV of FIG. 3.

This arrangement and form can be better seen in the cross-section of FIG. 3, where the relative and opposed positions of the wedge-shaped inclined surfaces 5B can be seen.

On the upper part of the back legs 3-4 there are provided cavities 3B-4B, adapted for receiving the ends of the back boards 7 to form, as a whole, the back of the chair.

Figure 5:
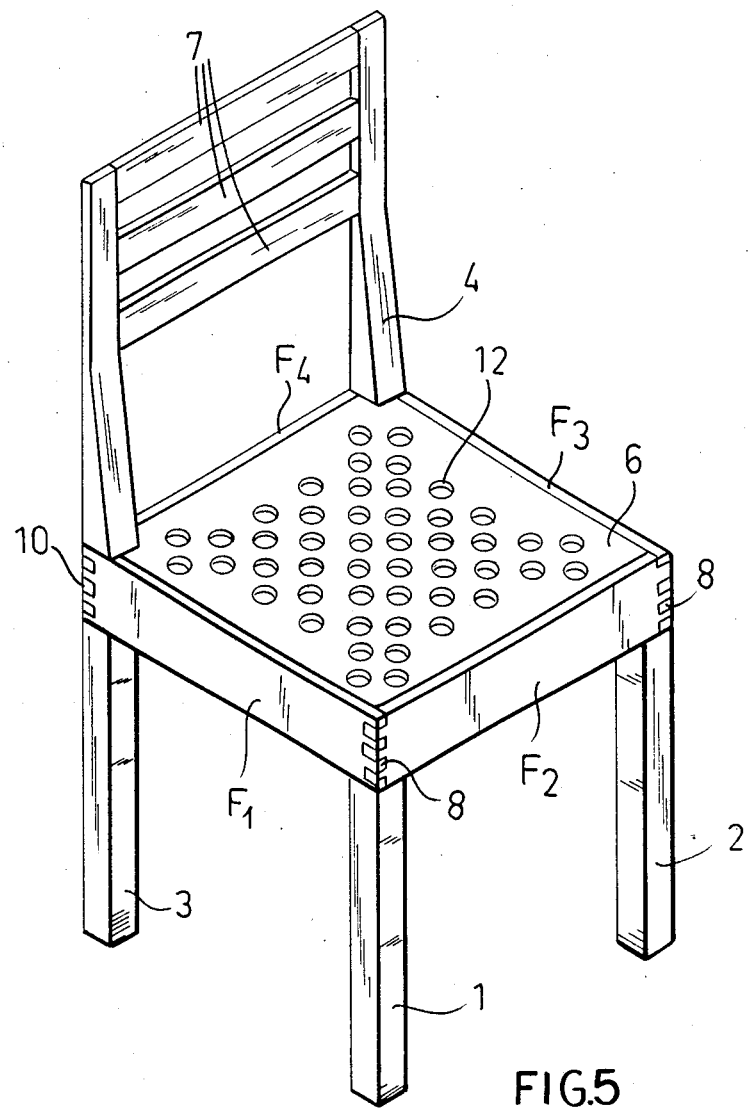
FIG. 5 is a perspective view of an assembled chair, complete with the seat plate.

The structure is completed by the seat 6 composed of a seat plate of any desired appearance, for example comprising holes 12, recesses, designs or the like (FIG. 5) and having, at each of the back corners, a recess 13 which fits the internal form of the respective back leg.

For blocking the elements, as will be stated below, a screw tie 14 is provided, having a head 14A and nut or wing nut 15, operated by hand or by spanner.

Assembling of the chair structure according to this invention is carried out in the following manner, with particular reference to FIGS. 1 and 2.

A start is made with the insertion of the back boards 7 into the associated cavities 3B-4B of the upper part, forming the chair back, of the rear legs 3 and 4, then the side members $F_1$, $F_4$ and $F_3$, hinged to one another by means of the pins 11, are placed in the respective recesses 3A,4A and connection of the side members $F_1$, $F_2$ and $F_3$ is completed, the two front hinges being made by the pins 9.

The hinged ends of said side members are then inserted into the recesses 1A,2A of the front legs 1,2 which thus adopt their position in the complex of the structure.

At this point, the spider C is inserted between the four legs, in such a manner that the respective shaped bearings or supports 5 come into bearing, with the recesses 5A, against the internal face of the legs and, with the inclined surfaces 5B, with the respective wedge-shaped surfaces 5C of the ends of the spiders $C_{1-2}$ and $C_{3-4}$.

Figure 2:
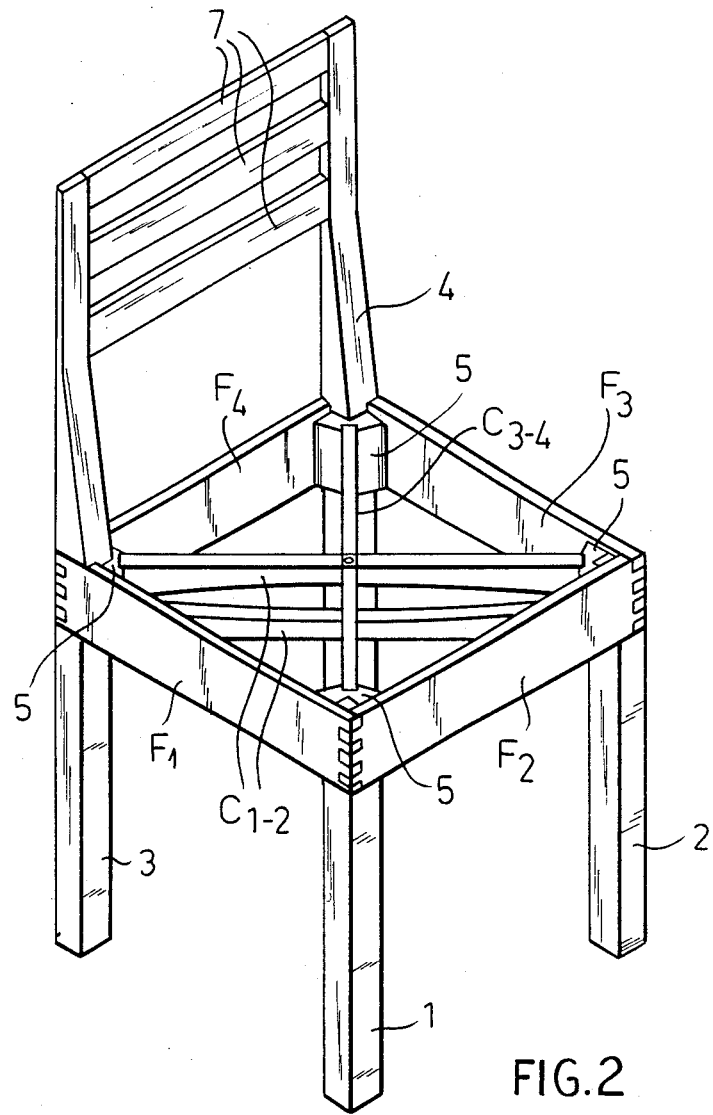
FIG. 2 is a perspective view of the chair of FIG. 1 when assembled.

The chair structure, assembled in this manner, is shown in FIG. 2, with all the elements, including the seat 6 and the tie 14, in their positions, but the structure itself is not yet stiffened ready for use, unavoidable constructional clearances being present between the various parts and in the hinges, which permit limited relative movements.

In order to achieve stiffening of the complete structure according to this invention, the seat plate 6 is inserted at the top, which comes into bearing with the corners on the shaped bearings or supports 5, already in position, and then the tie member 14 is introduced, with its head resting on a depression 6A of the seat 6, into the central hole of the spider C and the nut 15 is fitted against the spider itself. By tightening of the nut or wing nut 15, the action of the tie 14 is developed, consisting of bringing nearer together the arches $C_{1-2}$ and $C_{3-4}$ of each pair, thereby producing a wedge action with the respective inclined ends 5C against the corresponding surfaces 5B of the shaped bearings 5.

One component of the loading causes an outward thrust, which blocks in position the end hinges of the side members against the associated legs, thus subjecting the side members themselves to tension.

If the arrangement of the arches of the spider C permits or is designed for this purpose, by continuing the tightening action on the nut 15, after the opposed surfaces of the end wedges are blocked against one another by friction, it is possible to add a still further additional lateral thrust, by stressing the pair of opposed arches in slight bending towards each other, in such manner as to obtain small displacements of the ends by deflection of the arch itself for increasing the outward blocking thrust.

The final blocking position by effect of the wedge action of the ends of the spider C can be easily seen from FIG. 3, where it can be noted how the tie 14 pulls the arches of the pair against each other, with a movement of the wedge ends tending to force the bearings 5 further apart and therefore to bear against the end hinges.

From FIG. 3 it may also be noted that if, as stated, a slightly elastic form is given to the arches of the pair, then by tightening up the nut 15 a slight outward movement is obtained of the bearing end 5, with addition of the stiffening thrust.

The spider, comprising opposed arches, may also possess, at its ends, hinge bearings or the like, instead of the wedge planes 5C, 5B, to allow the arch-shaped spider elements to exert only the thrust action when the center of the spider elements themselves is compressed by the tie member.

It is also possible for the user to operate on the nut 15 if, for example, play is detected in the entire assembly as a result of temperature changes, humidity changes or the like, and it is also evident that assembly of the structure may be carried out directly by the user, the assembly operations being very simple and within everyone's scope.

With this structure, appropriately adapted and dimensioned, other items of furniture may be constructed, such as for example tables, beds, cupboards and the like, and it is also possible to provide for the stiffening spider to produce a tension action, instead of thrust action, at its ends, thereby producing if appropriately intended, a compression on the side members (instead of tension). In such a case the spider, instead of being composed of struts, would be composed of tension members having ends with a screw and control nut.

It will be understood that other variants are possible for the construction, without adhesives, of items of furniture of all types, also achieving the inherent advantages of the structure according to this invention, of eliminating any application of glue or adhesive, with the elimination of the associated operations and equipment, and also the possibility of storing, transporting and assembling the individual components with a minimum of space and directly on the job.

I claim:

1. A furniture structure with sectional elements, comprising a plurality of individual elements equipped with bearing fixings and hinges for connecting to one another, said elements being assembled in an intended bearing position and the structure being stiffened for use by means of a spider comprising a pair of opposed arches having oppositely inclined ends, which ends exert a thrust action on wedge-shaped supports, these supports in turn acting against said hinges and thrusting them outwards, under the action of a tie member which tends to bring the arches of the spider nearer to each other and consequently to force the inclined ends into respective seats formed by said wedge-shaped supports.

2. The structure according to claim 1, wherein said spider is composed of pairs of opposed arches, which arches, in addition to having inclined ends, are shaped to be partly elastic, thereby producing, in addition to the translatory action of the inclined end, also an outward strut action.

3. The structure according to claim 1 wherein said spider comprising opposed arches is provided at said ends, hinge bearings for only producing the strut action when the center of the spider is compressed by the associated tie member.

4. The structure according to claim 1 wherein a closure plate cooperates in the stiffening of the structure by fitting into respective seats in a position for use and by a force fit produced by said tie member of the spider.

5. A chair assembly, comprising:
   a first and a second front leg, each of said front legs being formed with a respective outer and inner faces;
   a first and a second rear leg, each of said rear legs having a respective inner and outer faces, said first front leg and said second rear leg forming a first pair of diagonally spaced legs and said second front leg and the first rear leg forming a second pair of diagonally spaced legs, at least one of said first and second pairs of diagonally spaced legs being formed with a respective support on each of said inner faces of the respective front and rear legs forming said one pair, each of said supports being provided with a wedge-shaped portion inclined toward the respective inner face of the respective leg;
   a plurality of side members operatively connected with one another and forming a peripheral frame of the chair assembly abutting respective outer faces of each of said front and rear legs;
   at least one arch bridging said one pair of diagonally spaced legs having the supports on the respective inner faces, said arch being formed with oppositely inclined ends juxtaposed with the respective inclined portion of each of said supports and being provided with a respective longitudinal concave inner edge, said inclined ends and inclined portions of the supports being complementary inclined;
   a seat member on said supports; and
   means for connecting said seat member with said arch, so that said inclined ends slide against respective inclined portions of said supports toward the inner faces of said one pair of diagonally spaced legs upon the movement of said arch toward said seat.

6. The chair assembly defined in claim 5 wherein said outer faces of said front and rear legs are formed with a respective shaped region at a distance from the respective lower end of each of said legs.

7. The chair assembly defined in claim 5 wherein each of said side members is formed with opposite ends and each of said opposite ends of the respective side member is provided with means for engaging said side members with one another.

8. The chair assembly defined in claim 7 wherein said means for engaging is tongue and groove joints with a plurality of aligned holes at the respective opposite ends of each of said side members and a respective hinge pin introducing into respective holes.

9. The chair assembly defined in claim 5 wherein said means connecting said seat member with said arch is a screw extending through said arch and said seat member and having a head on one of ends thereof and a nut on the opposite end thereof, said screw is equidistantly spaced from said edge-shaped ends of said arch.

10. The chair assembly defined in claim 5, further comprising another arch bridging the other pair of diagonally spaced front and rear legs.

11. The chair assembly defined in claim 5 wherein said pair of rear legs extend higher than said pair of front legs and said pair of rear legs is provided with means for adapting lateral members bridging said pair of rear legs.

12. A chair assembly, comprising:
   a pair of front legs, each of said front legs having a lower end thereof, said front legs being formed with a respective outer and inner longitudinal opposite faces;
   a pair of rear legs, each of said rear legs having a respective lower end and being provided with respective inner and outer longitudinal faces of the respective one of said rear legs;
   a respective support juxtaposed with each of said legs, said support having an inner and an outer sides, said outer side of the respective support being operatively connected with said inner face of each one of said front and rear legs and said support inner side having a wedge-shaped formation thereon formed with two slopes diverging toward the respective inner face of each of said legs;
   a plurality of side members operatively connected with one another and forming a peripheral frame of the chair assembly abutting respective outer faces of each of said front and rear legs at a distance from the lower ends of said legs;
   a first pair of spaced apart longitudinal arches bridging a first pair of diagonally spaced front and rear legs, each of said arches of said first pair being formed with opposite inwardly inclined ends juxtaposed with the respective inclined slopes of the respective support and being provided with a respective longitudinal inner edge, said longitudinal inner edges of the first pair of said arches being concave and facing each other;
   a second pair of spaced apart arches formed with respective longitudinal concave inner edges bridging the other diagonally spaced front and rear legs, each of said arches of the second pair of the arches being provided with opposite inclined ends, said slopes of each of said inner supports receiving the opposite ends of the respective pair of said arches, so that each of said inclined ends slides against the respective slope of each of said supports; and
   means interconnecting said pairs of said arches therebetween for sliding each of said inclined ends of said arches against the respective slopes of each of said supports upon bringing said arches toward one another.

* * * * *